June 9, 1925.                                                    1,541,209
B. COTTEN ET AL
ILLUMINATED GEAR SHIFT LEVER BALL FOR MOTOR VEHICLES
Filed Dec. 30, 1924

BOYD COTTEN
MALCOLM L. LANDESS
INVENTORS

BY John M. Spellman
ATTORNEY

Patented June 9, 1925.

1,541,209

UNITED STATES PATENT OFFICE.

BOYD COTTEN AND MALCOLM L. LANDESS, OF DALLAS, TEXAS, ASSIGNORS OF ONE-THIRD TO JACK BROWDER, OF DALLAS, TEXAS.

ILLUMINATED GEAR-SHIFT LEVER BALL FOR MOTOR VEHICLES.

Application filed December 30, 1924. Serial No. 758,812.

*To all whom it may concern:*

Be it known that we, BOYD COTTEN and MALCOLM L. LANDESS, citizens of the United States, residing at Dallas, in the county of Dallas and State of Texas, have invented certain new and useful Improvements in Illuminated Gear-Shift Lever Balls for Motor Vehicles, of which the following is a specification.

This invention relates to motor vechicle accessories and particularly to a gear shift lever ball.

The object of the invention is to provide a gear shift lever ball of glass, onyx or any suitable translucent material with a small electric light globe inside for illuminating the ball.

A further object of the invention is that the illuminated ball not only provides a smooth and comfortable hand purchase for the lever, but is highly ornamental, particularly at night.

Figure 1:
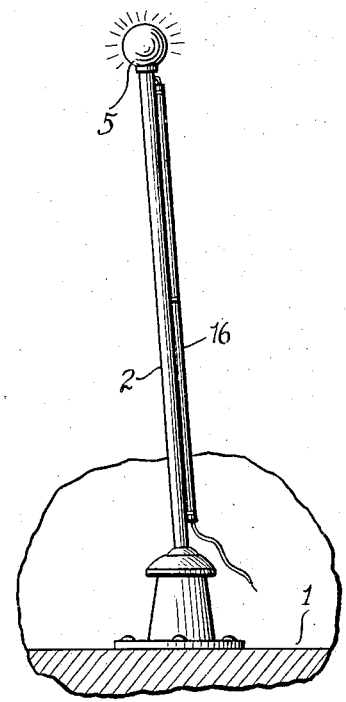
Figure 2:
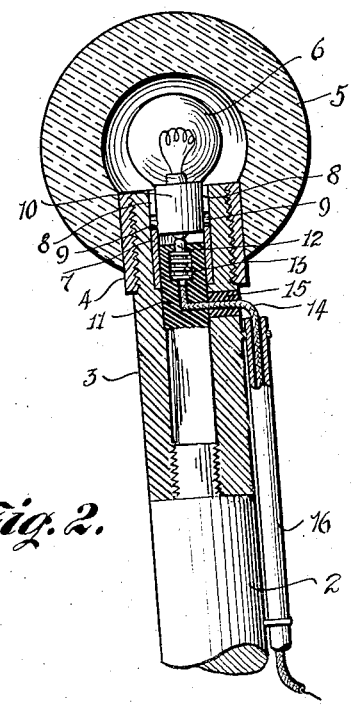

The illuminated gear shift lever ball will be clearly understood by reference to the following description, in connection with the accompanying drawing, forming part hereof, and in which:

Figure 1 is a side elevational view of a motor vehicle gear shift lever embodying the ball; and Figure 2 is an enlarged vertical sectional view of the upper end of the lever and ball illustrating the interior lighting arrangement.

Continuing the description of the invention and referring to its various parts more in detail, 1 denotes the floor board of an automobile and 2 the gear shift lever rod. The upper end of this rod is threaded to receive the lower threaded portion of a tubular member 3, clearly shown in Figure 2. This member is also threaded on its upper end to receive a cuff 4.

The ball 5 is made of any suitable translucent material, preferably onyx or glass, and is secured to the cuff 4, and is sufficiently hollow to provide space for a small electric light globe 6.

Within the upper end of tubular member 3 is a small tube 7 with longitudinal openings 8 on opposite sides for the reception of small pins 9—9 on the opposite sides of the globe base 10. These openings or slots are curved in opposite directions at their lower terminations so that when the globe base is inserted and given a slight turn the globe will be locked in position.

In the lower end of the tube 7 is tightly secured an insulating plug 11 in which is a pin 12 under tension of a spring 13. This pin bears against the teat on the globe base when the globe is pushed downward and locked in the openings 8—8.

The pin 12 is connected to a wire 14 which is passed through another insulating plug 15 and is carried through a tube 16, if preferred, to a battery or in the lighting circuit of the vehicle.

The ball 5 may be of any desired color and presents a neat and ornamental appearance to the vehicle as well as being novel and practical.

What is claimed is:

1. An illuminated gear shift lever ball for motor vehicles, in combination with the lever, comprising a threaded tubular member screwed onto the lever, a hollow ball of translucent material removably secured to the tubular member, an insulating plug seated in the tubular member and carrying a pin under spring tension, the pin connected to a wire leading to an electric battery, an electric light globe in the ball and adapted to be advanced upon the pin and means for locking the globe in electric contact with the battery.

2. An illuminated gear shift lever ball for motor vehicles in combination with the lever, comprising a threaded tubular member receivable onto the lever end, and a hollow ball of translucent material screwed onto the tubular member, an electric light globe in the ball, a small tube carrying an insulating plug and a spring tensioned pin seated in the tubular member, means in the tube to receive and lock the globe into contact with the pin and a wire connected to the pin and leading to the electric lighting system of the vehicle.

In testimony whereof they have signed their names to this specification.

BOYD COTTEN.
MALCOLM L. LANDESS.